July 7, 1953          E. H. BIRDSALL          2,644,361
PROJECTION PLOTTING LENS AND OPTICAL SYSTEM
Filed Sept. 30, 1946                         2 Sheets-Sheet 1

Inventor
EDWIN H. BIRDSALL
By M. O. Hayes
Attorney

July 7, 1953  E. H. BIRDSALL  2,644,361
PROJECTION PLOTTING LENS AND OPTICAL SYSTEM
Filed Sept. 30, 1946  2 Sheets-Sheet 2

Inventor
EDWIN H. BIRDSALL

By M O Hayes
Attorney

UNITED STATES PATENT OFFICE 2,644,361

PROJECTION PLOTTING LENS AND OPTICAL SYSTEM

Edwin H. Birdsall, San Diego, Calif., assignor to the United States of America as represented by the Secretary of the Navy Application September 30, 1946, Serial No. 700,258

5 Claims. (Cl. 88—24)

This invention relates to a light projecting system and more particularly to lenses for projecting a line of light.

Plotting devices such as that shown in the application of George A. Bretell, Serial No. 641,607, filed January 16, 1946, and, as referred to therein, in the earlier application of Firth Pierce and George A. Brettell, Jr., Ser. No. 599,502 filed June 14, 1945, now U. S. Patent No. 2,566,247, issued August 28, 1951, are desirable for use with dead reckoning tracers. In such devices the plotting point is determined by a spot of light. In my invention the intersection of two lines of light sets forth the plotting point. This improves the visual presentation of the point and makes for greater accuracy.

The most important use for plotters of this type has been at sea where radar and/or sonar gear provide ranges and bearings of friendly and enemy ships and aircraft. Under all conditions where these factors are obtained, it is also usually of interest to maintain a continuous plot of the movements of all other vessels and aircraft for assistance in tactical maneuvers and navigation.

In the past, in order to study the movements of other ships, aircraft, etc., which herein will be called targets, it has been customary to receive oral information of ranges and bearings and plot the position of the target relative to the position of the ship on which the gear was mounted by means of a drafting machine. This method, involving the use of a dead reckoning tracer (DRT), was slow and subject to many errors and inaccuracies. The present invention is a mechanism for use with portions of the DRT equipment, and not only provides means for quickly plotting the positions of targets, but eliminates many of the errors connected with the use of the older plotting methods.

Before describing the present invention, a word should be said concerning the DRT, which is well known in the art. It comprises, in general, a glass-topped table over which is laid a thin sheet of plotting paper on which a plot is made. A compass-rose, representing the position at which the plot is made, which, herein, will be called own ship, is supported just under the glass top by a positioning mechanism which moves the compass-rose in a manner determined by the movements of the ship. This mechanism usually comprises a frame mounted on a lead screw for supporting the rose. The lead screw extends the width of the plotting table and its ends are mounted in a pair of supports which are arranged to be driven along a pair of parallel rails to produce one component of motion. The lead screw is rotated to drive the compass-rose frame in a perpendicular direction, which latter motion provides the perpedicular component of motion. It is thus seen that the compass-rose may be made to travel under the glass top in a path similar (but to a smaller scale) to the path of the ship on which it is mounted, if the components of the ship's motion are applied to these mechanisms. A light is placed under the rose and its position is thus projected on the plotting paper above. As ranges and bearings of targets are obtained, they are manually plotted on the paper, relative to the position indicated by the rose.

An object of this invention is to provide a simple lens which will project a line of light.

Another object is to provide a rugged and efficient projection system which will provide two intersecting lines of light on a translucent surface.

A further object is the use of a conical lens to project a line of light at an angle to the lens.

The invention also resides in certain novel features of optical structures and arrangements which facilitate the carrying out of the foregoing objects and which contribute both to the simplicity of the device and to the reliability of operation as well as to the ease and expeditious manner of plotting a point.

Other objects and advantages of the invention will become apparent from the following detailed description taken in connection with the accompanying drawings in which.

Figure 1:
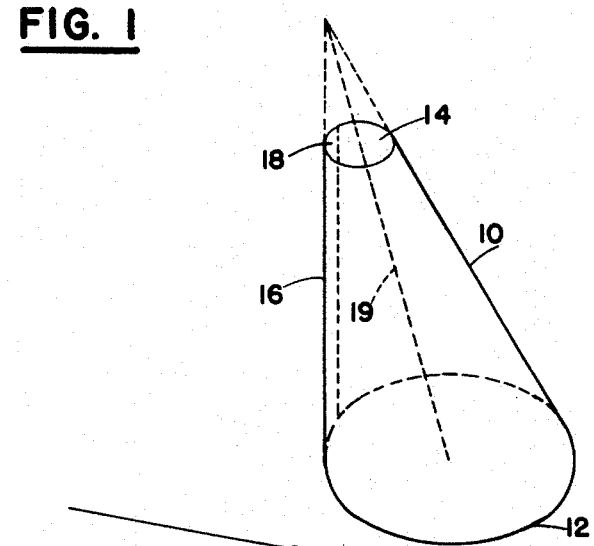
Figure 1 is an isometric view of the cone from which the lens is developed.

While the invention is susceptible of various modifications and alternative arrangements I have shown in the drawings and will herein describe in detail the preferred embodiments. It is to be understood however that I do not intend to limit the invention by such disclosure for I aim to cover all modifications and alternative arrangements falling within the spirit and scope of the invention as defined in the appended claims.

Figure 2:
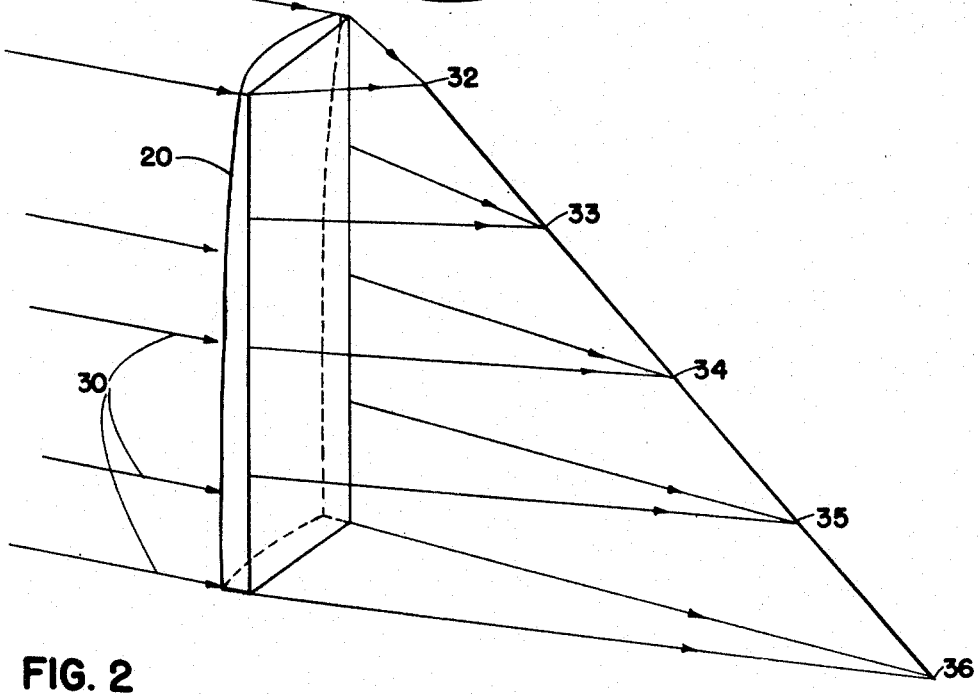
Figure 2 is an optical diagram of the lens and a projected line of light.

The shape and construction of the conical lenses may be seen from Figures 1 and 2. In Figure 1 a truncated scalene cone 10 has a circular base 12 and circular top 14, both perpendicular to element 16 of the conical surface. A plano-convex section such as 18 out of such a cone forms lens 20.

The action of the lens 20 is shown in Figure 2. The lens receives rays of light 30 that are substantially parallel. At the top of the lens where the focal length is 4 inches, these rays are focused to a point 32 that is 4 inches from the lens. At the bottom where the focal length is 60 inches the rays come to a focus at a point 36 which is 60 inches from the lens. At intermediate levels the light will be focused at distances between 4 and 60 inches. Since from an examination of the cone of Figure 1 it is clear that the radius of curvature of the lens varies uniformly with distance from top to bottom it must also be clear that the distance at which the rays 30 are brought to a focus varies uniformly with the distance from the top to the bottom of the lens and that the points, such as 32, 33, 34, 35 and 36, at which the light focuses lie on a single straight line. In fact, this line lies at the center line 19 of the cone that the lens constitutes a section of.

Figure 3:
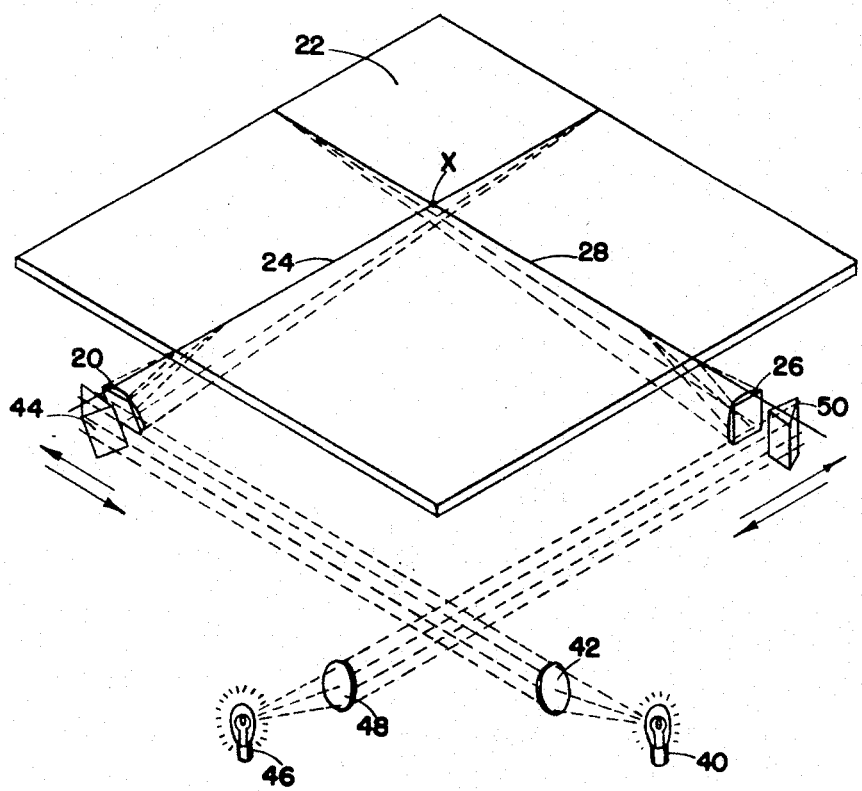
Figure 3 is an isometric schematic view of the projection systems and translucent surface.

In Figure 3, lens 20 projects light against the under surface of translucent plotting table 22 so as to produce an illuminated streak 24. A similar lens 26 produces a second streak 28 intersecting the first at position X of the plotting surface for indicating the position of a target. As stated above this device may be used with a dead reckoning tracer. Light for lens 20 is provided by light source 40. The light is directed by lens 42 and prism 44 so as to fall on the flat surface of conical lens 20. Light source 46, lens 48 and prism 50 provide light in a similar manner for lens 26.

In the system of Figure 3 the lens 20 is tilted up to make the line of focus 32—36 lie in the plotting surface where it appears as streak 24. Here lens 20 and reflecting prism 44 move together. The light source 40 and condenser lens 42 direct substantially parallel light rays along the line of travel of lens and prism and prism 44 directs it against lens 20 which in turn focuses it onto the plotting surface.

The lens 20 and 26 are adapted to be moved along their respective edges of the table 22 for positioning the streaks 24 and 28 in accordance with the north-south and east-west coordinates of the position of a target. An attendant merely marks the position X with a pencil and then has the lenses 20 and 26 moved to indicate automatically the position of another target.

What I claim is:

1. A lens comprising a plano-convex longitudinal section of a truncated scalene cone, said section having a longitudinally convex outer face and a longitudinally plane rear face, a flat circular base surface and a smaller circular top surface on said section, a different radius of curvature for said section, said radius of curvature uniformly increasing with distance from the top to the base surface of said section, a loci of focal points for said section being on a substantially straight line inclined to the base of the said scalene cone, said focal points being equal to substantially two times said radius of curvature and lying beyond the center line of the cone from which said section is taken, whereby the focal length is short where the radius of curvature is small and increases with the increase in radius to produce a straight line along the loci of said focal points.

2. A projection system comprising a translucent surface, a light source, a collimating lens for collimating the light from said light source, means positioning said light source adjacent said translucent surface, a first scalene conical sectioned lens comprising a plano-convex section of a truncated scalene cone positioned to receive the collimating light from said light source, said section having a longitudinally convex outer face and a longitudinally plane rear face, means securing said lens between said translucent surface and said source of light and with said translucent surface positioned in the focal plane of said scalene conical lens, whereby light rays emitted from said source of light pass through said lens to project a continuous line of light on said translucent surface.

3. The combination of claim 2 that includes means comprising a second similar scalene conical sectioned lens positioned to receive collimating light from a light source and positioned on a side of said translucent surface adjacent the side facing said first lens, a second source of light and a collimating lens for collimating light from said second source of light, means securing said second lens between said translucent surface and said second source of light, means including a reflecting prism directing light rays from said source of light through said lens on to said translucent surface, whereby the line of light on said surface from said first lens intersects the line of light on said surface from said second lens.

4. A light projection system for plotting a remote object comprising a rectangular translucent surface, a pair of light sources each respectively positioned near adjacent sides of said surface and including collimating lens means for collimating the light from said source, a pair of movable scalene conical sectioned lens means, each of said lens means comprising a triangular reflecting prism means positioned adjacent to a plano-convex section of a truncated scalene cone, said section having a longitudinally convex outer face and a longitudinally plane rear face, means securing said triangular prism in close proximity in operative relationship to said plano-convex section, means respectively positioning each of said lens means on said adjacent sides of said surface and in line with each of said light sources so that rays of light from said light sources are deflected by said reflecting prism means and said lens means to form intersecting beams of light on said surface.

5. A light projection system for plotting a remote object comprising a rectangular translucent surface, a pair of movable scalene conical sectioned lens means, means positioning said lens means near adjacent sides of said surface, each of said lens means comprising a triangular prism and a plano-convex section of a truncated scalene cone, said section having a longitudinally convex outer face and a longitudinally plane rear face, a radius of curvature for said section, said radius of curvature uniformly increasing with distance from the top to the base surface of said section, a loci of focal points for said section, said focal points being equal to substantially two times the said radius of curvature and lying on the center line of the cone from which said section is taken, a first light source directing light rays parallel to one of said adjacent sides, a second light source directing light rays parallel to the other of said adjacent sides, and means respectively securing each of said triangular prisms between each of said light sources and said sections, whereby said light rays are deflected by said prisms and said sections to form intersecting beams of lights on said translucent surface.

EDWIN H. BIRDSALL.

References Cited in the file of this patent

UNITED STATES PATENTS

| Number | Name | Date |
|---|---|---|
| 1,349,336 | Haddock | Aug. 10, 1920 |
| 1,589,797 | Eppenstein | June 22, 1926 |
| 1,692,973 | Babcock | Nov. 27, 1928 |
| 1,705,951 | Wright | Mar. 19, 1929 |
| 1,771,844 | Eilenberg et al. | July 29, 1930 |
| 1,837,979 | Mensman | Dec. 22, 1931 |
| 1,953,299 | Grant | Apr. 3, 1934 |
| 1,989,295 | Sewell | Jan. 29, 1935 |
| 2,066,996 | Morioka | Jan. 5, 1937 |
| 2,291,152 | Carter | July 28, 1942 |
| 2,372,494 | Hogan et al. | Mar. 27, 1945 |

FOREIGN PATENTS

| Number | Country | Date |
|---|---|---|
| 250,268 | Great Britain | July 29, 1926 |